United States Patent
Hara et al.

(10) Patent No.: US 7,379,753 B2
(45) Date of Patent: May 27, 2008

(54) METHOD AND APPARATUS FOR COMMUNICATION, AND COMPUTER PRODUCT

(75) Inventors: Masahiro Hara, Kawasaki (JP); Shinichiro Mori, Kawasaki (JP); Nobutsugu Fujino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 11/000,760

(22) Filed: Dec. 1, 2004

(65) Prior Publication Data

US 2006/0009266 A1    Jan. 12, 2006

(30) Foreign Application Priority Data

Jul. 6, 2004    (JP)    ............... 2004-199333

(51) Int. Cl.
*H04M 1/00*    (2006.01)

(52) U.S. Cl. ............... 455/552.1; 455/553.1; 455/103; 455/132; 455/436

(58) Field of Classification Search ............ 455/552.1, 455/553.1, 103, 132, 436; 370/338, 331
See application file for complete search history.

(56) References Cited

U.S. PATENT DOCUMENTS 5,428,664 A    6/1995    Kobayashi

| | | |
|---|---|---|
| 2002/0025839 A1 | 2/2002 | Usui |
| 2003/0227939 A1 | 12/2003 | Yuki et al. |
| 2004/0090937 A1* | 5/2004 | Chaskar et al. ............. 370/331 |
| 2004/0264424 A1* | 12/2004 | Hirsbrunner et al. ....... 370/338 |
| 2004/0266426 A1* | 12/2004 | Marsh et al. ............ 455/426.2 |

FOREIGN PATENT DOCUMENTS

| | | |
|---|---|---|
| JP | 2001-298780 | 10/2001 |
| JP | 2002-135203 | 5/2002 |
| JP | 2003-319010 | 11/2003 |
| JP | 2004-129024 | 4/2004 |

* cited by examiner

*Primary Examiner*—Sanh D. Phu
(74) *Attorney, Agent, or Firm*—Greer, Burns & Crain, Ltd.

(57) ABSTRACT

In a portable phone having installed therein a PHS and a WLAN, the PHS is used for standby as long as the PHS is in the coverage area. At the time of receiving an incoming call during standby by the PHS with only the PHS being ON, the power of WLAN is turned ON. If the WLAN is in the coverage area, the incoming call is once disconnected, and immediately a VoIP call is sent (call back) by the WLAN. At this time, the PHS is turned OFF. On the other hand, if the WLAN is out of the coverage area at the time of receiving the incoming call, the call is similarly disconnected, after which the WLAN is turned OFF and the VoIP call is sent by the PHS.

15 Claims, 15 Drawing Sheets

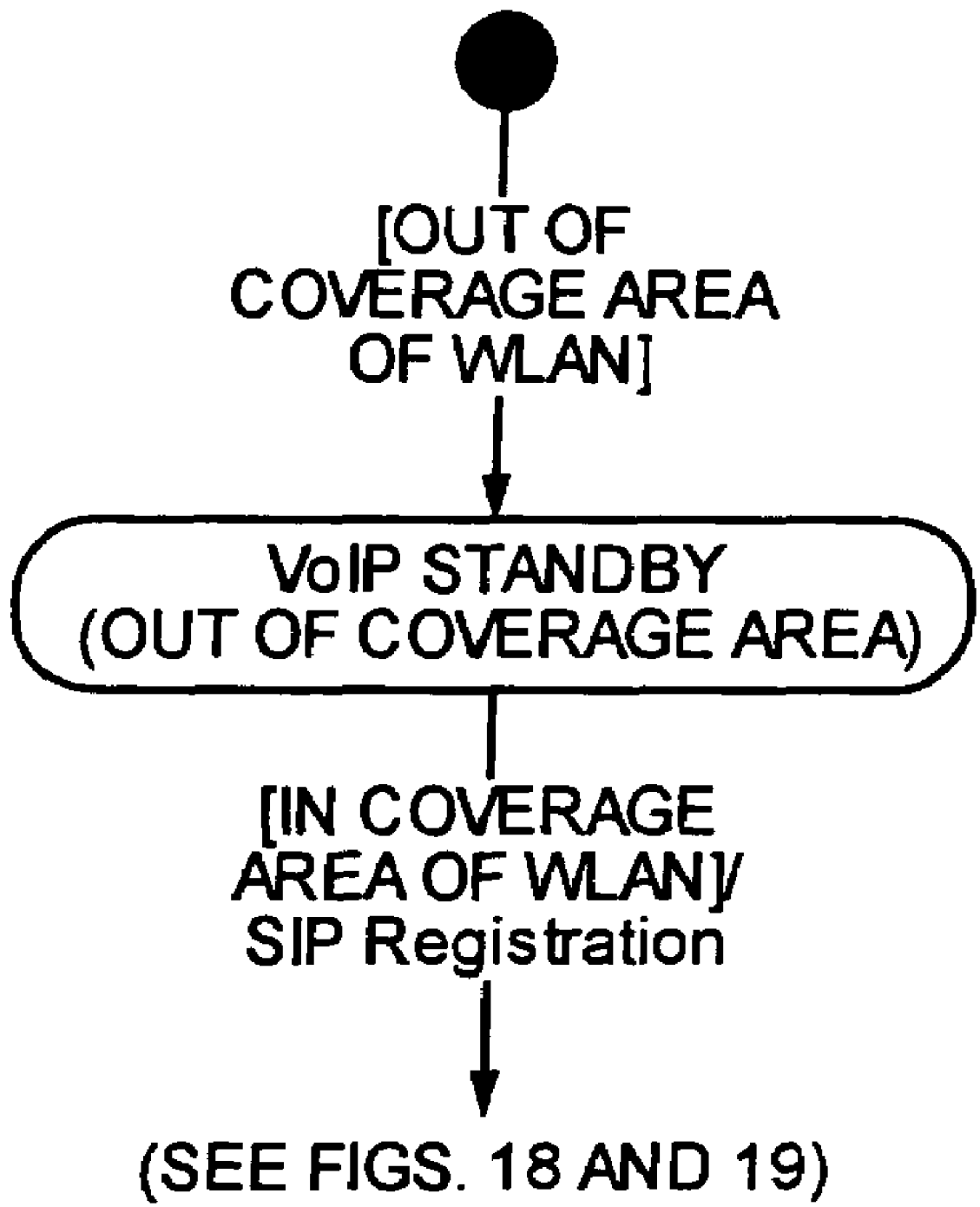

METHOD AND APPARATUS FOR COMMUNICATION, AND COMPUTER PRODUCT

BACKGROUND OF THE INVENTION

1) Field of the Invention

The present invention relates to a power supply control in a voice communication apparatus that includes a plurality of radio communication devices.

2) Description of the Related Art

In the field of portable phones (including a PHS), there are growing needs for realizing what is called IP (Internet Protocol) telephony that lowers telephone charges by using the Internet or a similar IP network in place of the Public Switched Telephone Network. The public radio network of portable phones covers a wide coverage area but has a narrow bandwidth. On the other hand, a WLAN (wireless LAN) has a wide bandwidth but covers a narrow coverage area such as corporations, homes, public hot spots. To compensate for the defects, communication terminals including a plurality of communication interfaces (such as the PHS, the WLAN) have been already suggested.

However, such a terminal needs to switch the interfaces seamlessly to allow continuation of voice communication. To meet this requirement, a technology called VoIP (Voice over IP), which means voice communication over IP, is used in the terminal. That is, a communication via every interface is connected over IP to perform a VoIP communication. Since a WLAN communication is usually connected over IP, VoIP can be used as it is, but in the PHS, it is necessary to use VoIP after IP connection by PPP. This makes it possible to realize seamless roaming disclosed in Japanese Patent Application Laid-Open No. 2003-319010 or Japanese Patent Application Laid-Open No. 2004-129024.

Since it is necessary for the terminal with a plurality of communication interfaces to supply power to every interface, power consumption increases. In particular, power consumption of the WLAN is very high. As a result, the standby time of the terminal disadvantageously becomes shorter. To reduce power consumption and lengthen the standby time, it has been already suggested, as disclosed in Japanese Patent Application Laid-Open No. 2002-135203, to stand by with a narrowband wave receiving circuit with comparatively lower power consumption, and to supply power to a mediumband or wideband wave receiving circuit upon receiving an incoming call.

In the conventional technology, however, as described in FIG. 13 which explains an eighth embodiment of the Japanese Patent Application Laid-Open No. 2002-135203, power supply to the narrowband receiving circuit is continued even during communication in the mediumband or wideband wave. As a result, extra power is consumed. Moreover, another incoming call is disadvantageously received even during communication in the mediumband or wideband wave, which makes the control complex. Furthermore, the terminal cannot receive any incoming call when the terminal is out of the coverage area of narrowband wave, even if it is in the coverage area of the mediumband or wideband wave.

SUMMARY OF THE INVENTION

It is an object of the present invention to solve at least the problems in the conventional technology.

A voice communication method according to an aspect of the present invention includes detecting an incoming call to a first radio communication device; supplying power to a second radio communication device when the incoming call is detected; determining whether the second radio communication device is capable of performing communication; selecting a radio communication device from either one of the first radio communication device and the second radio communication device based on a result of determination; and calling back to a caller of the incoming call using the radio communication device.

A voice communication apparatus according to another aspect of the present invention includes a detecting unit that detects an incoming call to a first radio communication device; a power supplying unit that supplies power to a second radio communication device when the incoming call is detected; a determining unit that determines whether the second radio communication device is capable of performing communication; a selecting unit that selects a radio communication device from either one of the first radio communication device and the second radio communication device based on a result of determination; and a calling back unit that calls back to a caller of the incoming call using the radio communication device.

A computer program according to still another aspect of the present invention causes a computer to realize the method according to the present invention.

A computer-readable recording medium according to still another aspect of the present invention stores the computer program according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 20 is a state transition diagram of the apparatus 100, with only the WLAN, is in the VoIP standby state out of the coverage area of the WLAN.

DETAILED DESCRIPTION

Exemplary embodiments of a voice communication method, a voice communication apparatus, a computer product according to the present invention will be explained in detail with reference to the accompanying drawings.

Figure 1:
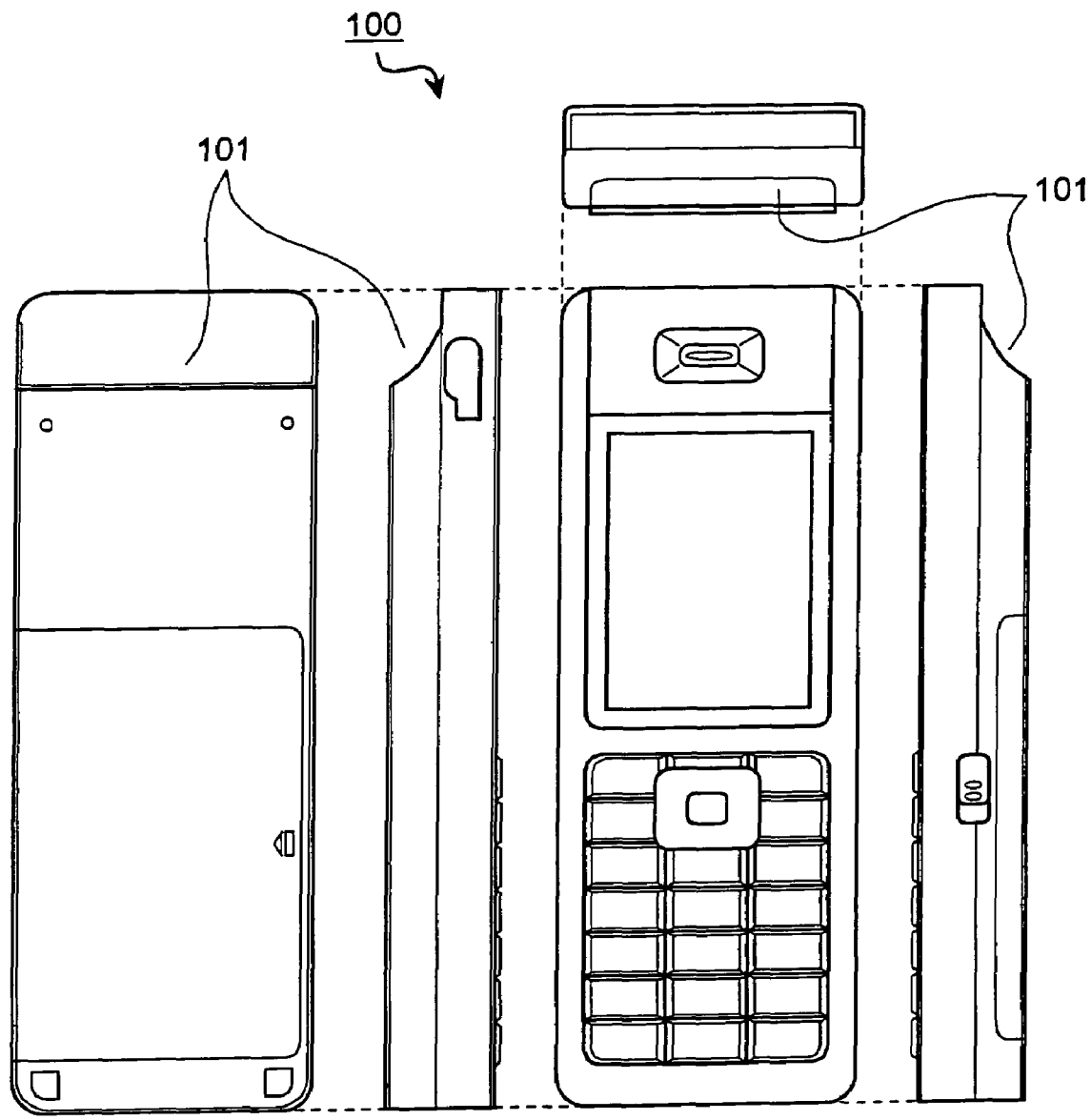
FIG. 1 is external views of a voice communication apparatus according to a first embodiment of the present invention.

FIG. 1 illustrates external views, that is, front view, rear view, side view, and top view of a voice communication apparatus according to a first embodiment of the present invention. A voice communication apparatus 100 has substantially the same external appearance and dimensions as a conventional portable phone. The difference between the two is that the apparatus 100 has on its upper rear-side, a card slot 101 for inserting thereinto a CF-type PHS card.

Figure 2:
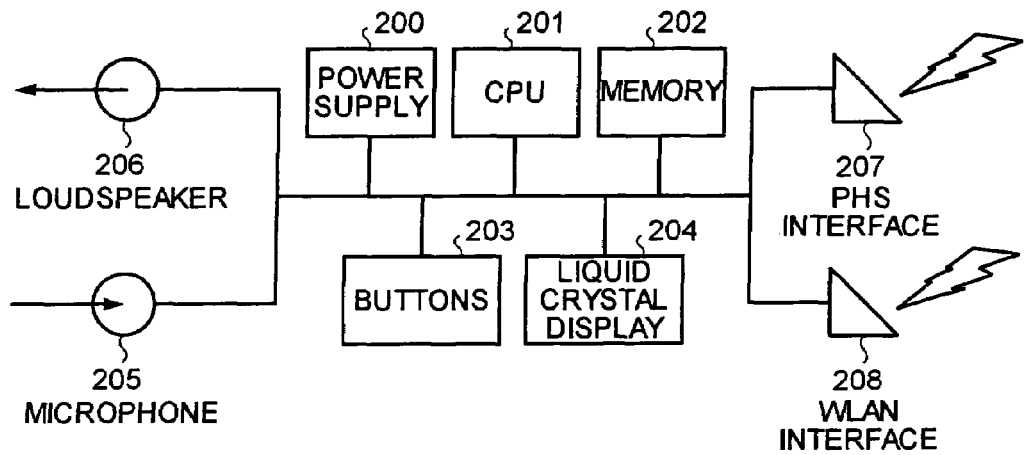
FIG. 2 is an explanatory diagram of the hardware configuration of the voice communication apparatus.

FIG. 2 is an explanatory diagram of the hardware configuration of the apparatus 100. A reference sign 200 denotes a power supply that supplies power to respective parts in the apparatus 100, 201 denotes a CPU that controls the entire apparatus 100, and 202 denotes a memory that stores computer programs and/or data. A reference sign 203 denotes buttons for various operations such as numeric keys and cross keys, 204 denotes a liquid crystal display that displays a menu or the like, 205 denotes a microphone for inputting voice into the apparatus 100, and 206 denotes a loudspeaker for outputting voice to the outside of the apparatus 100. A reference sign 207 denotes a PHS interface that controls radio communications with a CS (cell station). These components are the same as those in the conventional portable phone, but the difference between the two is that the apparatus 100 has a WLAN interface 208 that controls radio communications based on IEEE 802.11b, in addition to the PHS interface 207.

The PHS interface 207 is specifically a CF-type PHS card, which is assumed herein to be inserted in the card slot 101 of the apparatus 100. Accordingly, the apparatus 100 has either a hardware configuration (1) that includes both of the PHS interface 207 and the WLAN interface 208, or a hardware configuration (2) that includes only the WLAN interface 208, but the following description will be of the hardware configuration (1) unless otherwise specified.

Since the hardware configuration (1) causes a problem of interrupting a telephone conversation at the time of switching between the PHS and the WLAN, the apparatus 100 implements seamless roaming through utilization of the conventional technology described above. On the other hand, as for the problem of high power consumption and short standby time, the apparatus 100 basically stands by in the PHS with only the PHS turned ON and the WLAN turned OFF for as long as possible, thereby saving power during standby. More specifically, the apparatus 100 stands by in the PHS as long as it remains in the coverage area of the PHS regardless of whether it is in or out of the coverage area of the WLAN, and the apparatus 100 stands by in the WLAN only when it is out of the coverage area of the PHS and it is in the coverage area of the WLAN.

Figure 3:
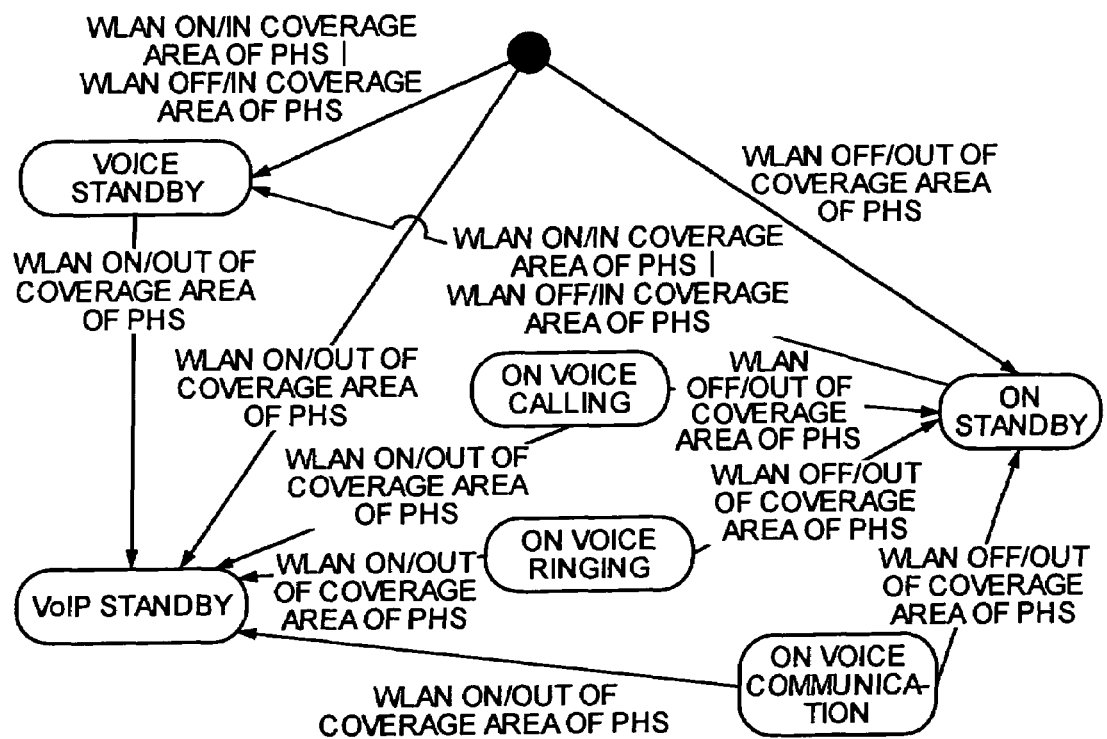
FIG. 3 is a state transition diagram of the voice communication apparatus being out of a coverage area of a PHS in the initial state.
Figure 4:
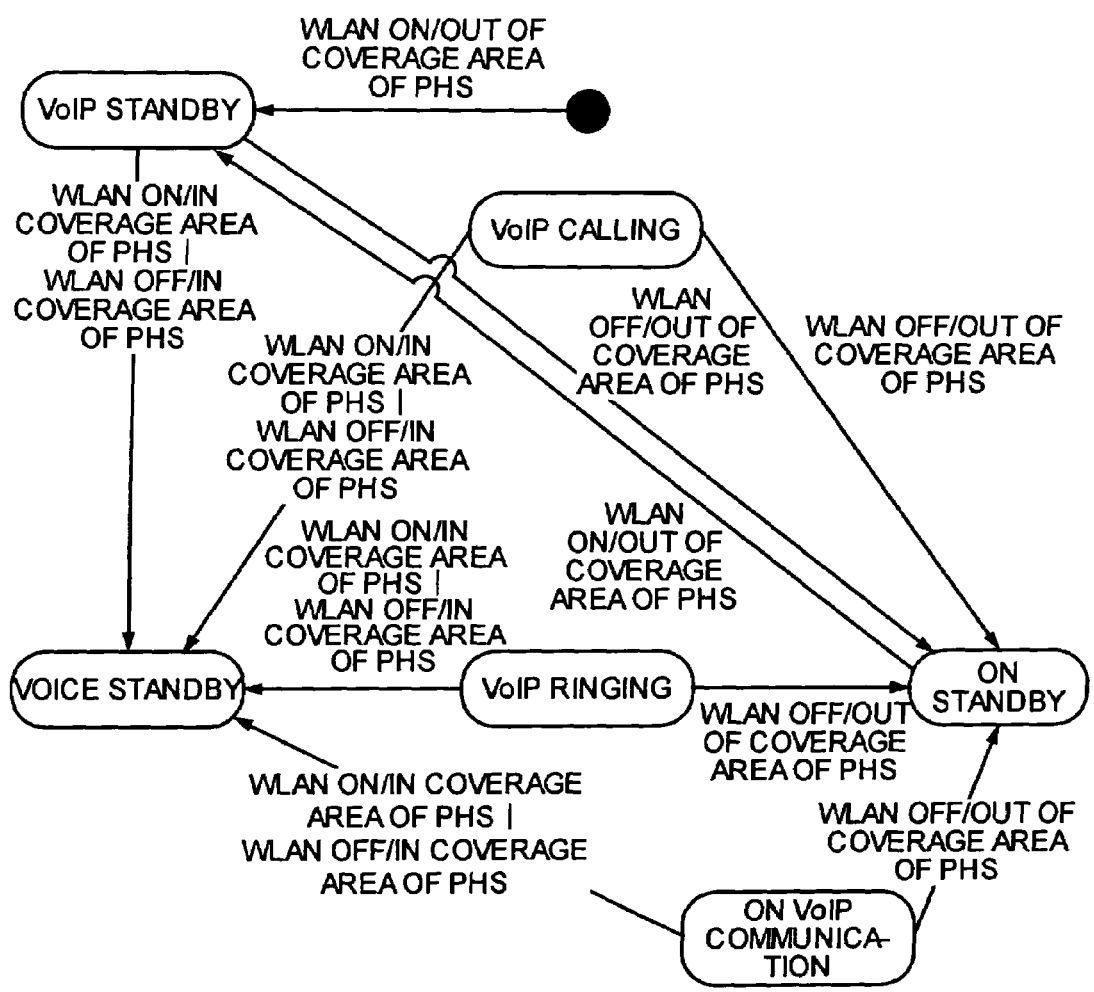
FIG. 4 is a state transition diagram of the voice communication apparatus being out of the coverage area of the PHS in the initial state.

FIGS. 3 and 4 are state transition diagrams for explaining in which of the PHS and the WLAN the apparatus 100 stands by. FIG. 3 depicts an example in which the apparatus 100 is out of the coverage area of the PHS in the initial state (i.e. when the apparatus 100 is turned ON) indicated by the filled-in circle, whereas FIG. 4 depicts an example in which the apparatus 100 is in the coverage area of the PHS. "Voice standby" means the PHS standby state. In the PHS standby state, the PHS is turned ON and the WLAN is turned OFF. "VoIP standby" means the WLAN standby state. In the WLAN standby state, the PHS is, in principle, turned OFF (to be exact, periodically turned ON for intermittent reception) and the WLAN is turned ON. "On Standby" means a state in which the apparatus 100 cannot receive any call by either of the PHS and the WLAN but stands by for an incoming call by the PHS.

Upon reception of an incoming call, the apparatus 100 selects a method for connection to the caller (for example, which the PHS or the WLAN is used), and establishes connection to the caller by the selected method. The feature of the present invention lies in this function, therefore the function is mainly explained below.

Figure 5:
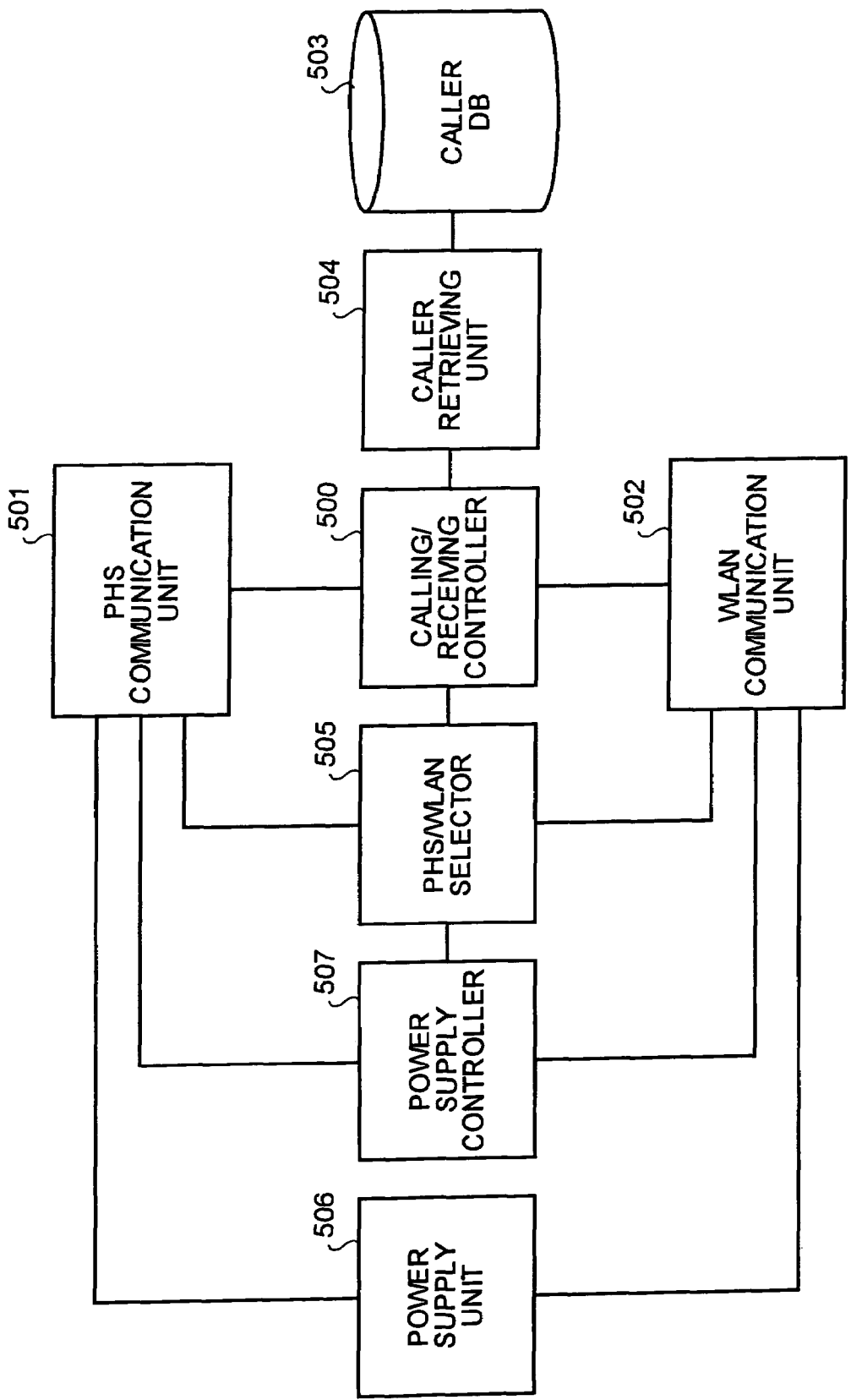
FIG. 5 is an explanatory diagram of the functional configuration of the voice communication apparatus.

FIG. 5 is an explanatory diagram of the functional configuration of the apparatus 100. A reference sign 500 denotes a calling/receiving controller that controls calling and receiving operations of the apparatus 100. The operations are basically the same as those of the conventional portable phone, except that in the present invention, the operations include processing of immediately cutting off an incoming call after PHS call reception and calling back via the PHS or the WLAN to the IP telephone number posted from a caller retrieving unit 504. The calling/receiving controller 500 is implemented by the CPU 201 shown in FIG. 2.

A reference sign 501 denotes a PHS communication unit that controls radio communications with the CS. A reference sign 502 denotes a WLAN communication unit that controls radio communications based on IEEE 802.11b. The PHS communication unit 501 is implemented by the PHS interface 207 shown in FIG. 2, and the WLAN communication unit 502 is implemented by the WLAN interface 208.

A reference sign 503 denotes a caller DB (database) that stores a plurality of telephone numbers. In the caller DB 503, each caller's (1) telephone number (telephone number of fixed-line telephone or portable phone), which is identification information on the Public Switched Telephone Network, and (2) telephone number (specifically, "050-XXXX-XXXX" or SIP address), which is identification information on the IP network, are stored in correspondence to each other. The caller DB 503 is implemented by the memory 202 shown in FIG. 2.

It is assumed herein, for convenience of explanation, that the telephone numbers (1) and (2) are identification information of physically the same telephone. However, for example, the telephone number of a telephone 1 and the telephone number of a telephone 2 can also be stored in correspondence to each other for one caller. As described later, however, upon receiving an incoming call from the telephone of the telephone number (1), the apparatus 100 cuts off the incoming call and calls back to the telephone number (2). Therefore, the caller cannot receive the call back in effect unless the telephones 1 and 2 are physically close to each other.

A reference sign 504 denotes a caller retrieving unit that retrieves from the caller DB 503 the IP telephone number corresponding to the caller's telephone number, that is, the source telephone number posted from the calling/receiving controller 500. The caller retrieving unit 504 is implemented by the CPU 201 shown in FIG. 2.

A reference sign 505 denotes a PHS/WLAN selector that selects any one of the PHS communication unit 501 and the WLAN communication unit 502 to call back to the caller. The PHS/WLAN selector 505 is implemented by the CPU 201 shown in FIG. 2.

A reference sign 506 denotes a power supply unit that supplies the PHS communication unit 501 and the WLAN communication unit 502 with power for their operation. A reference sign 507 denotes a power supply controller that instructs the PHS communication unit 501 and the WLAN communication unit 502 to determine whether to be supplied with power from the power supply unit 506. The power supply unit 506 is implemented by the power supply 200 shown in FIG. 2, and the power supply controller 507 is implemented by the CPU 201.

Figure 6:
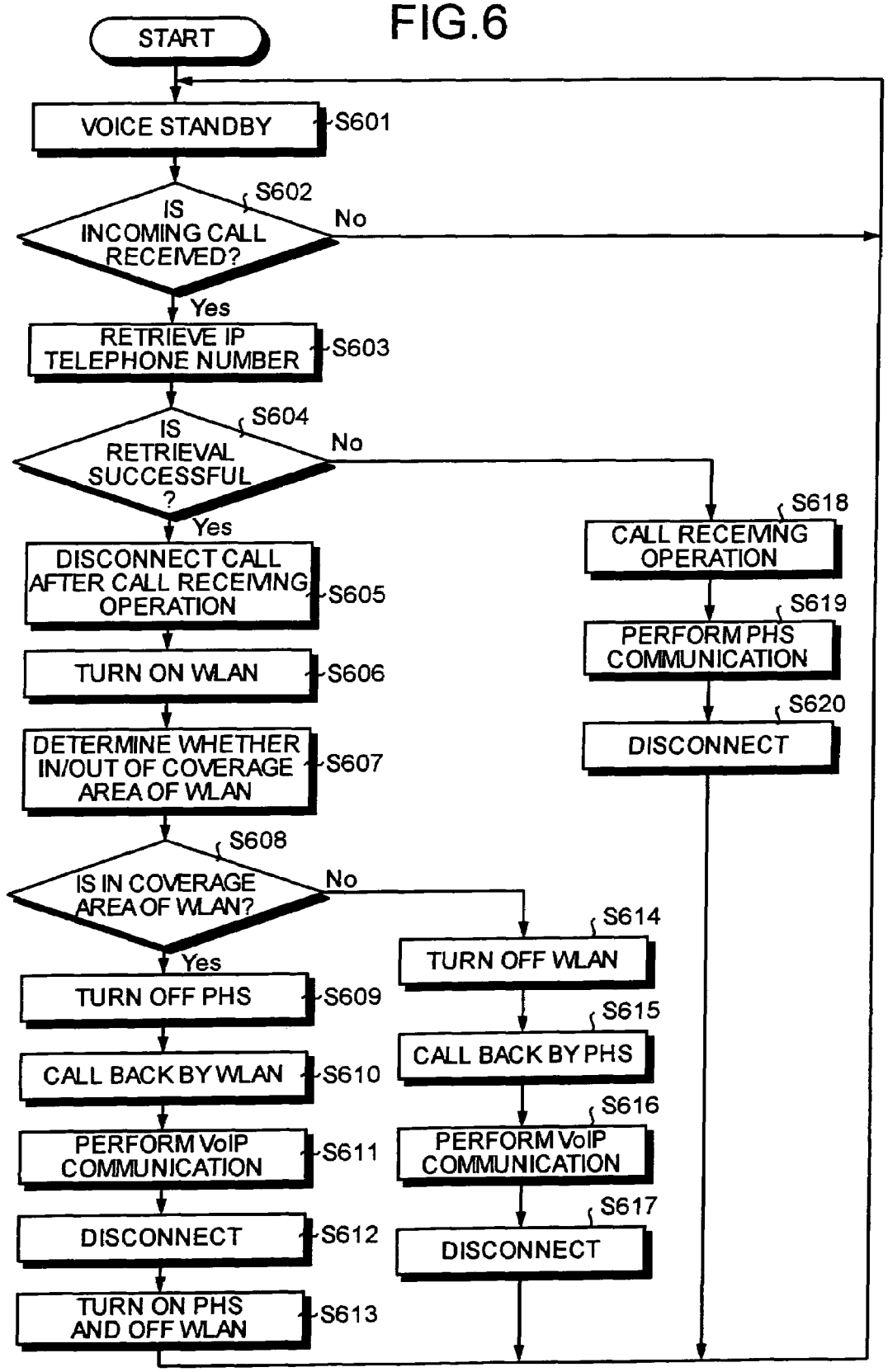
FIG. 6 is a flowchart of the procedure of voice communication by the voice communication apparatus when an incoming call is received during voice standby.

FIG. 6 is a flowchart of the procedure for voice communication by the apparatus 100 when an incoming call is received during voice standby (standby by the PHS).

When step S601 is performed, only the PHS is turned ON (with the WLAN turned OFF). If the calling/receiving controller 500 receives a notification of an incoming call from the PHS communication unit 501 in this state (step S602: Yes), the caller retrieving unit 504 notified of the source telephone number from the calling/receiving controller 500 retrieves the IP telephone number corresponding to the above-mentioned number from the caller DB 503 (step S603).

If the IP telephone number can be retrieved, that is, when the IP telephone number as the call back destination can be specified (step S604: Yes), the caller retrieving unit 504 posts the success in the retrieval and the retrieved IP telephone number to the calling/receiving controller 500. The calling/receiving controller 500 performs a usual call receiving operation, such as the generation of a ring tone, after which it instructs the PHS communication unit 501 to disconnect the call before the user of the apparatus 100 answers the telephone and counting of the telephone charge to the caller starts (step S605).

The calling/receiving controller 500 instructs the PHS/WLAN selector 505 to select which of the PHS and the WLAN is used to call back to the caller. That is, the PHS/WLAN selector 505 instructs the power supply controller 507 to supply power to the WLAN, and in response to a power-on signal from the power supply controller 507, the WLAN communication unit 502 becomes ON (step S606). Accordingly, when step S606 is performed, the PHS and the WLAN are both ON (both being operable).

The PHS/WLAN selector 505 controls the thus activated WLAN communication unit 502 to determine whether the apparatus 100 is in or out of the coverage area of the WLAN (step S607), and if it is in the coverage area (step S608: Yes), the PHS/WLAN selector 505 notifies the calling/receiving controller 500 to call back by the WLAN, and at the same time, instructs the power supply controller 507 to stop the power supply to the PHS. In response to a power-off signal from the power supply controller 507, the PHS communication unit 501 becomes OFF (step S609). Accordingly, after step S609 is performed, only the WLAN is ON.

On the other hand, the calling/receiving controller 500 controls the WLAN communication unit 502 to make a VoIP call back to the IP telephone number retrieved at step S604 (step S610). After the called-back party answers the telephone, voice communication is performed using VoIP (step S611), and upon disconnection of the call (step S612), the calling/receiving controller 500 posts the disconnection to the PHS/WLAN selector 505. If the apparatus 100 is not out of the coverage area of the PHS at this point in time, the PHS/WLAN selector 505 instructs the power supply controller 507 to turn ON the PHS which has been turned OFF until then and to turn OFF the WLAN which has been turned ON until then. Having received signals from the power supply controller 507, the PHS communication unit 501 becomes ON and the WLAN communication unit 502 becomes OFF (step S613), followed by a return to step S601 to continue voice standby.

In contrast to the above, when the apparatus 100 is out of the coverage area of the WLAN (step S608: No), the PHS/WLAN selector 505 notifies the calling/receiving controller 500 to call back by the PHS, and at the same time, instructs the power supply controller 507 to stop the power supply to the WLAN. On receiving the power-off signal from the power supply controller 507, the WLAN communication unit 502 becomes OFF (step S614). As a result, after step S614 is performed, only the PHS is ON again which is the same as in the PHS standby state.

On the other hand, the calling/receiving controller 500 controls the PHS communication unit 501 to call back using PPP and VoIP to the IP telephone number retrieved at step S604 (step S615). After the called-back party answers the telephone, voice communication is performed using VoIP (step S616), and upon disconnection of the call (step S617), the disconnection is posted to the PHS/WLAN selector 505. Then, if the apparatus 100 is not out of the coverage area of the PHS at this point in time, the procedure returns to step S601 to continue voice standby.

In contrast to the above, when the IP telephone number cannot be retrieved from the caller DB 503 (step S604: No), since no call back destination can be specified, the call received by the PHS is processed as-is. That is, the calling/receiving controller 500, notified by the caller retrieving unit 504 of a failure in retrieval, performs the usual call receiving operation (step S618) and, after the user of the apparatus 100 answers the telephone, performs normal PHS communication (step S619), and upon disconnection of the call (step S620), posts the disconnection to the PHS/WLAN selector 505. If the apparatus 100 is not out of the coverage area of the PHS at this point, the procedure returns to step S601 to continue voice standby.

Figure 7:
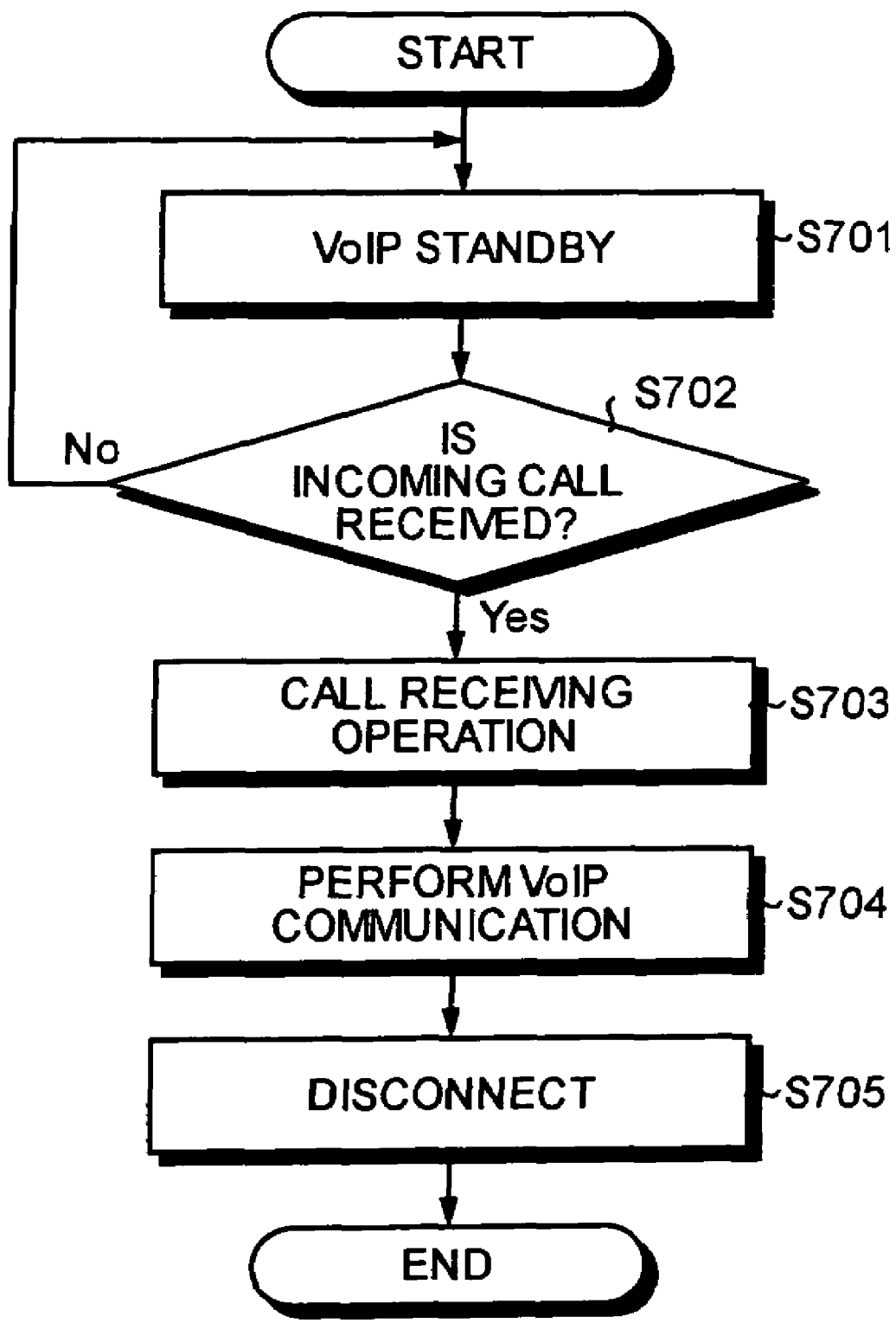
FIG. 7 is a flowchart of the procedure of voice communication by the voice communication apparatus when an incoming call is received during VoIP standby.

FIG. 7 is a flowchart of the procedure for voice communication by the apparatus 100 when an incoming call is received during VoIP standby (standby by the WLAN).

When step S701 is performed, only the WLAN is turned ON (with the PHS turned OFF). If the calling/receiving controller 500 receives a notification of an incoming call from the WLAN communication unit 502 in this state (step S702: Yes), the calling/receiving controller 500 performs the usual call receiving operation (step S703), and after the user of the apparatus 100 answers the telephone, performs VoIP communication by the WLAN (step S704). And upon disconnection of the call (step S705), the VoIP standby at step S701 is continued.

To summarize explanations with reference to FIGS. 6 and 7, (1) when the apparatus 100 is at a location where the PHS can be used, that is in the coverage area of the PHS, the PHS exclusively stands by irrespective of whether the WLAN can be used, and upon receiving an incoming call by the PHS, the subsequent operations fall into three patterns: (1-1) a call-back by the WLAN when the IP telephone number of the caller is specified and the WLAN is usable; (1-2) a call-back by the PHS when the IP telephone number is specified but the WLAN is not usable; and (1-3) answering the incoming call when the IP telephone number is not specified.

On the other hand, (2) when the apparatus 100 is at a location where the PHS is not usable and only the WLAN is usable, the WLAN exclusively stands by, and upon receiving an incoming call by the WLAN, (2-1) the call is received as it is by the WLAN. This is the same as the normal VoIP communication by a PC with only the WLAN mounted therein, for example, and during communication the PHS does not turn ON in principle (except at the time of intermittent reception).

According to the first embodiment, the WLAN turns ON from the time immediately after the reception of an incoming call to the end of communication (steps S606 to S613) in the instance of (1-1), and only for a moment immediately after the reception of an incoming call (steps S606 to S608 and step S614) in the instance of (1-2), and in the instance of (1-3), the WLAN remains OFF throughout the process. In the instance of (2-1), the WLAN remains ON throughout the process (steps S701 to S705), but since the coverage area is limited where the PHS is not usable and only the WLAN is usable, it is expected that the ON-state duration of the WLAN is not so long. In this way, the apparatus 100 minimizes power supply to the WLAN with high power consumption, thereby ensuring reduction of power consumption and lengthening of standby time.

In the first embodiment, the WLAN becomes ON generally at the time explained above. Precisely, the apparatus 100 consumes power to determine, at predetermined time intervals, whether it is in/out of the coverage areas of the PHS and the WLAN (3) when it is at a location where neither the PHS nor the WLAN is usable. The determination enables the apparatus 100 to shift to voice standby or VoIP standby immediately after it comes into the coverage area of the PHS or the WLAN. In a second embodiment described below, power can be saved by extending at least the WLAN standby time, which leads not to energize the WLAN frequently when it is turned out that the apparatus 100 is out of the coverage areas of both the PHS and the WLAN.

Figure 8:
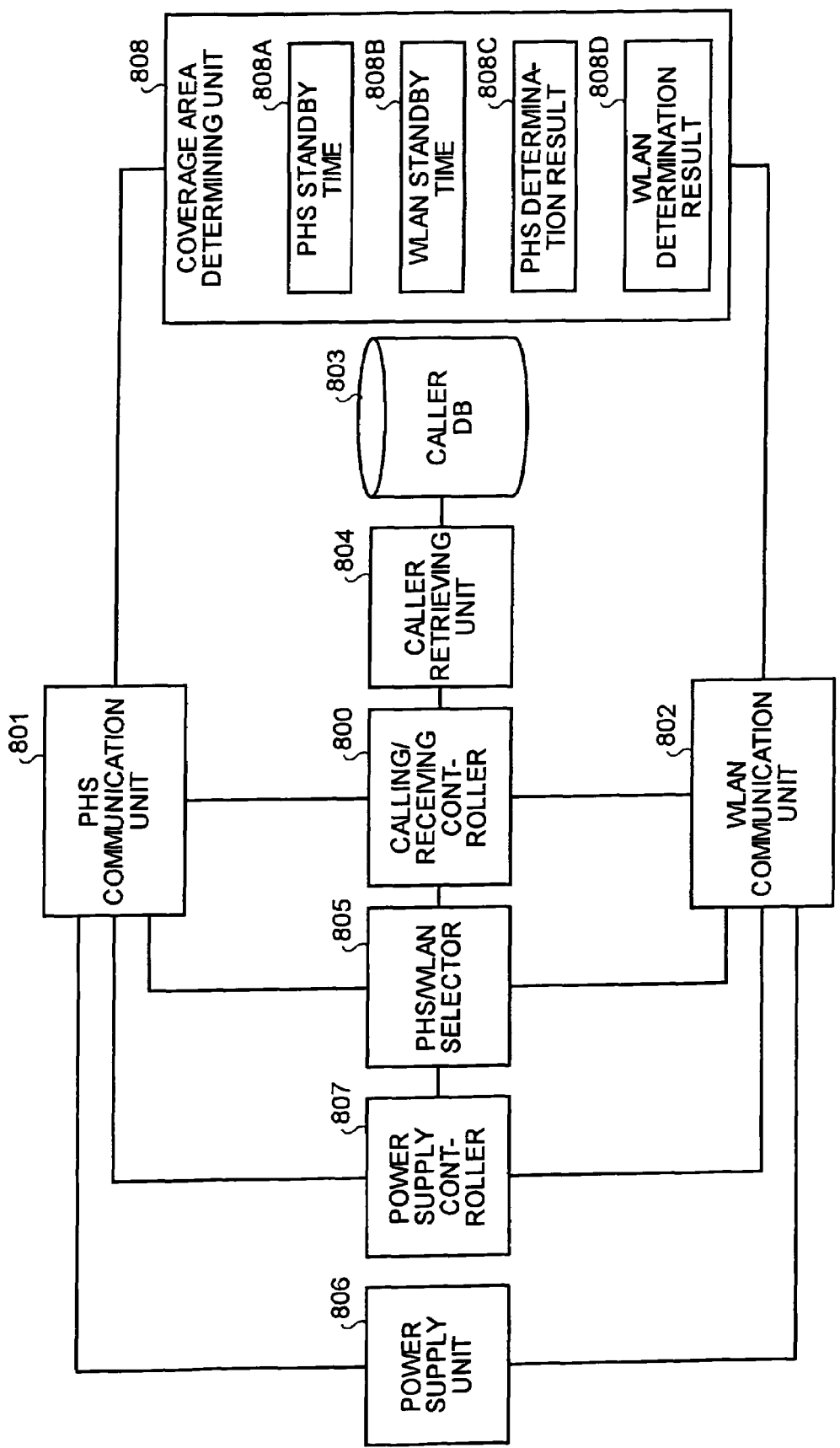
FIG. 8 is an explanatory diagram of the functional configuration of the voice communication apparatus according to a second embodiment of the present invention.

A voice communication apparatus 100 according to the second embodiment of the present invention has the same hardware configuration as the first embodiment shown in FIG. 2. FIG. 8 is an explanatory diagram of the functional configuration of the apparatus 100 according to the second embodiment of the present invention. The difference of the second embodiment from the first embodiment shown in FIG. 5 is that the apparatus 100 according to the second embodiment has a coverage area determining unit 808. Those of the functions of the shown respective units that differ from those in the first embodiment will be described one by one in the flowchart referred to below.

Figure 9:
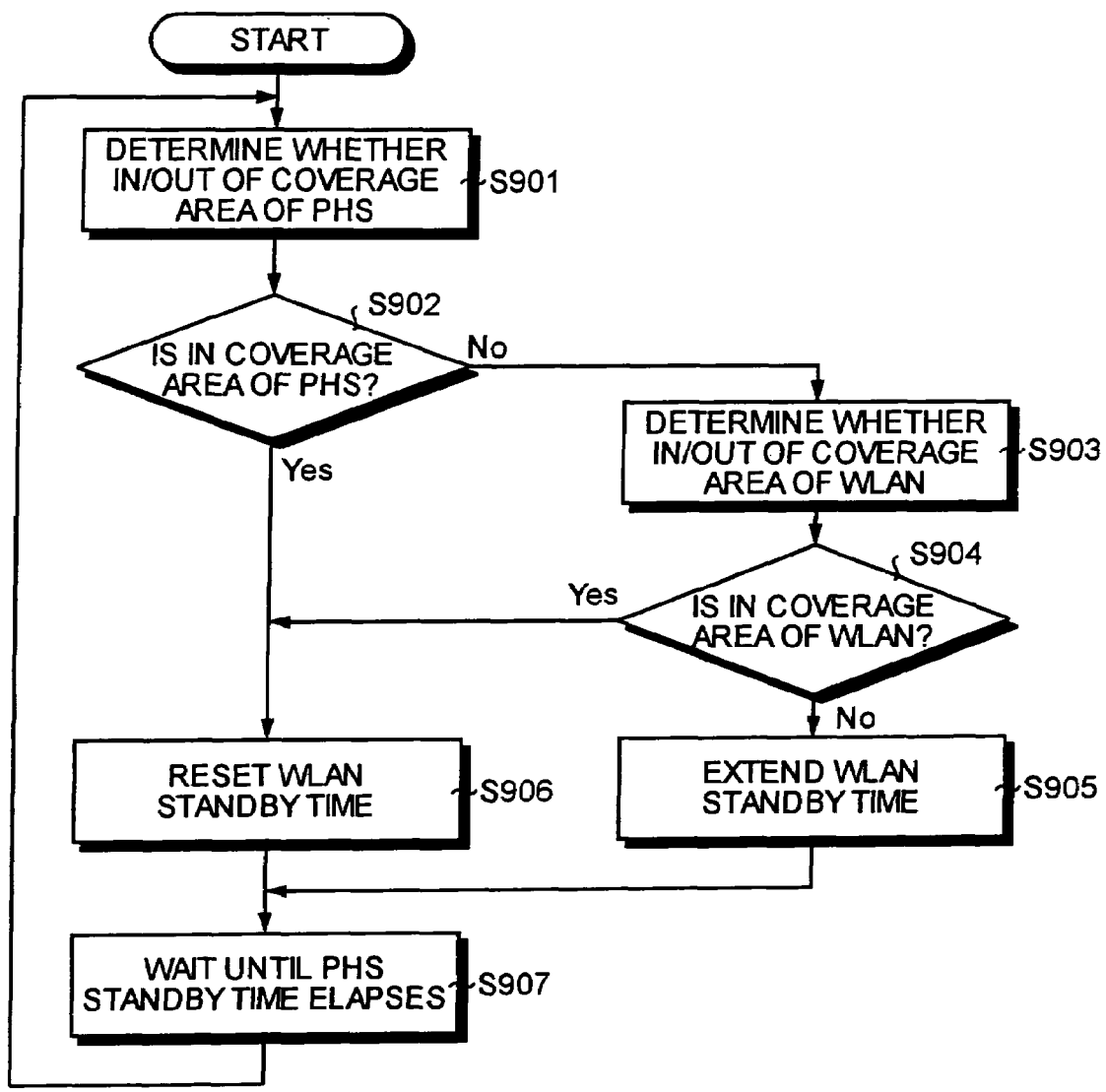
FIG. 9 is a flowchart of the procedure for changing the WLAN standby time in the voice communication apparatus.

FIG. 9 is a flowchart of the procedure for changing the WLAN standby time in the apparatus 100. The coverage area determining unit 808 determines whether the apparatus 100 is in/out of the coverage area of the PHS when a predetermined PHS standby time 808a elapses, and stores the result of determination as a PHS determination result 808c. The coverage area determining unit 808 also determines whether the apparatus 100 is in/out of the coverage area of the WLAN when a predetermined WLAN standby time 808b elapses, and stores the result of determination as a WLAN determination result 808d. Upon the determination whether the apparatus 100 is in/out of the coverage area of the WLAN, the coverage area determining unit 808 changes the WLAN standby time 808b by the procedure shown in FIG. 9.

Upon each elapse of PHS standby time 808a, the coverage area determining unit 808 controls a PHS communication unit 801 to determine whether the apparatus 100 is in/out of the coverage area of the PHS (Step S901). Obviously, when the PHS is OFF, the coverage area determining unit 808 instructs a power supply controller 807 to supply the PHS with power prior to the determination. When the apparatus 100 is out of the coverage area of the PHS (step S902: No), the coverage area determining unit 808 controls a WLAN communication unit 802 to determine whether the apparatus 100 is in/out of the coverage area of the WLAN (Step S903). Obviously, when the WLAN is OFF, the coverage area determining unit 808 instructs the power supply controller 807 to supply the WLAN with power prior to the determination.

When the apparatus 100 is also out of the coverage area of the WLAN (step S904: No), the coverage area determining unit 808 adds a predetermined time to the WLAN standby time 808b to extend the standby time (step S905). On the other hand, when the apparatus 100 is in the coverage area of the WLAN (step S904: Yes), the coverage area determining unit 808 resets the WLAN standby time 808b, which is extended or might be extended by previous rounds of processing based on the flowchart, to an initial value (step S906). When the apparatus 100 is in the coverage area of the PHS (step S902: Yes), the WLAN standby time 808b is similarly reset (step S906). The coverage area determining unit 808 waits until the PHS standby time 808a elapses (step S907), after which the procedure returns to step S901 to repeat the above-described processing.

According to the second embodiment, if the apparatus 100 is out of the coverage areas of both the PHS and the WLAN at the timing of the periodic determination, the WLAN standby time is extended stepwise, in other words, the WLAN start-up interval increases stepwise. Accordingly, the number of times power is supplied to the WLAN decreases, leading to suppression of power consumption.

The PHS determination result 808c and the WLAN determination result 808d which are intermittently acquired upon each elapse of the PHS standby time 808a and the WLAN standby time 808b and are stored in the coverage area determining unit 808, can be used to determine whether the apparatus 100 is in/out of the coverage area of the WLAN at the time of receiving an incoming call at step S607 in FIG. 6, for example. At the time of the determination, a PHS/WLAN selector 805 can quickly select which of the PHS and the WLAN is used to call back, by referring to the latest PHS determination result 808c and WLAN determination result 808d stored in the coverage area determining unit 808 without inquiring the WLAN communication unit 802.

The first and the second embodiments described above are adapted to make a call back by the WLAN when the PHS and the WLAN are both usable. This is because the WLAN is usually advantageous over the PHS in terms of cost, to put it concretely, virtually no telephone charge is involved. However, the user may sometimes wish to save battery or lengthen the standby time, and to use the PHS at a place where the PHS is usable even if a telephone charge is involved. Since what is considered as cost changes according to users or circumstances, it is favorable to have the user choose, as initial setting or at each time of call back, which of the PHS and the WLAN is to be used when the PHS and the WLAN are both usable.

In the first and the second embodiments, whether to call back to the caller after once disconnecting the received call (i.e. the Call back scheme described at steps S608 to S617 in FIG. 6) or to answer the call (i.e. the Direct connection scheme described at steps S618 to S620 in FIG. 6) is determined depending on whether the IP telephone number of the call back destination can be specified. But the user may sometimes wish to directly answer the call even if the call back destination is specified, so it is possible to allow the user to choose between the two schemes at the time of receiving an incoming call.

In the first and the second embodiments described above, continuous voice communication by switching the PHS and the WLAN seamlessly can be realized only with the apparatus 100, without any need for additional facilities or modifications to existing facilities. Needless to say, however, it is possible to build a more advanced, convenient system by modifying the existing SIP server or the like and combining it with the apparatus 100. For example, from the standpoint of the caller, the call back immediately following disconnection of every call after only one-call duration (furthermore, the call back is sometimes made to a telephone different from that used for calling) is somewhat unnatural if the caller has no knowledge of the system arrangement. In this instance, by holding the incoming call in the SIP server on the line without disconnecting the call and by connecting it to the call back from the apparatus 100, it is possible to implement the call back without giving the caller an unnatural impression.

Figure 10:
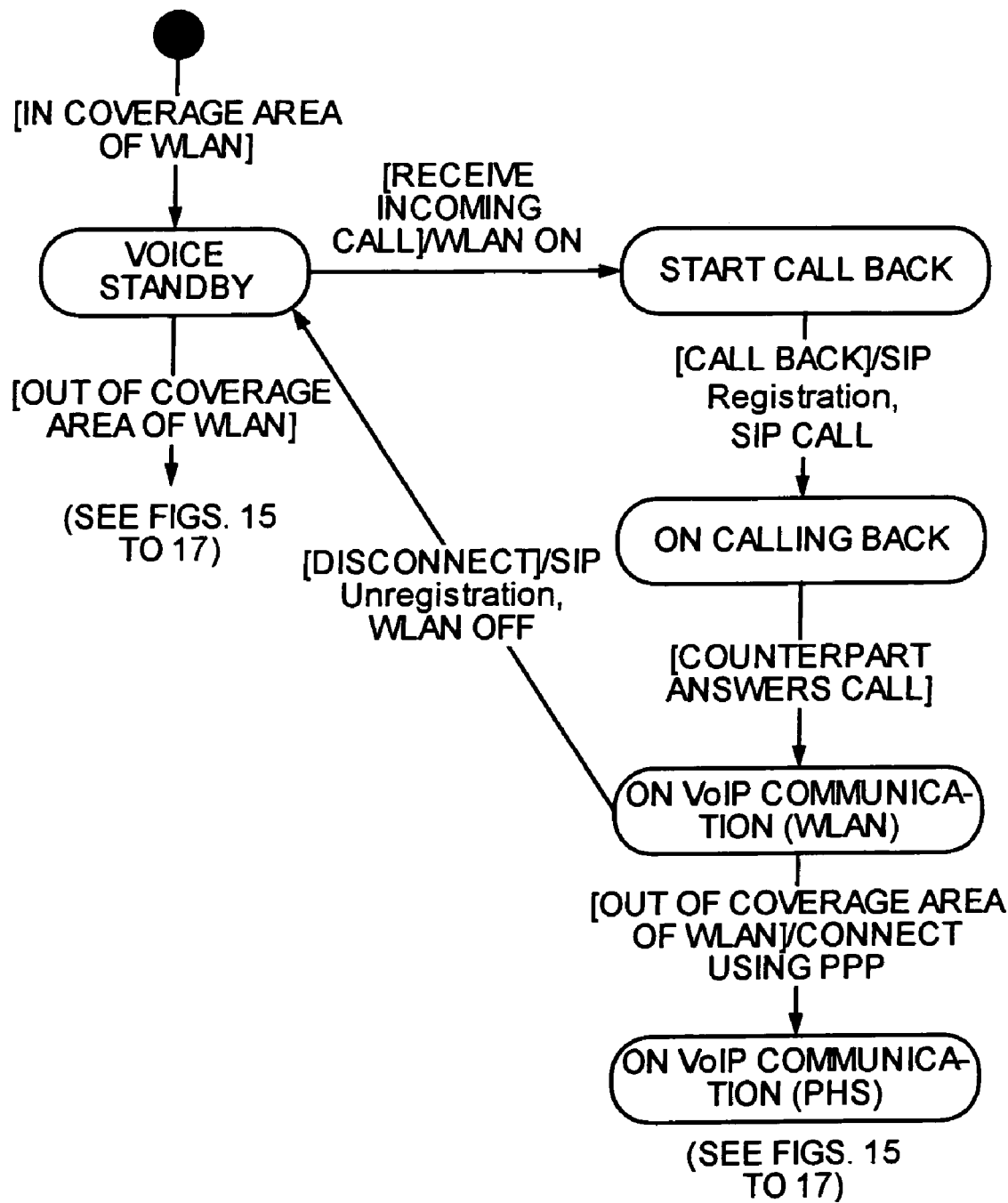
FIG. 10 is a state transition diagram of the voice communication apparatus receiving an incoming call during voice standby in the coverage area of the WLAN.
Figure 11:
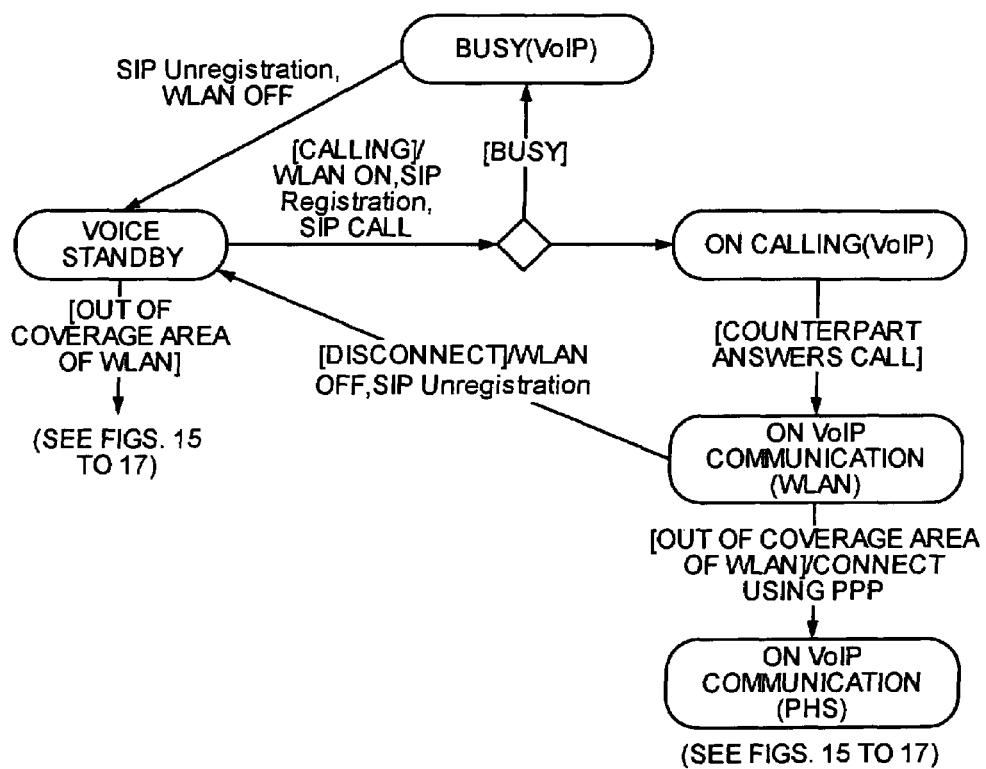
FIG. 11 is a state transition diagram of the voice communication apparatus making a VoIp call in the coverage area of the WLAN.
Figure 12:
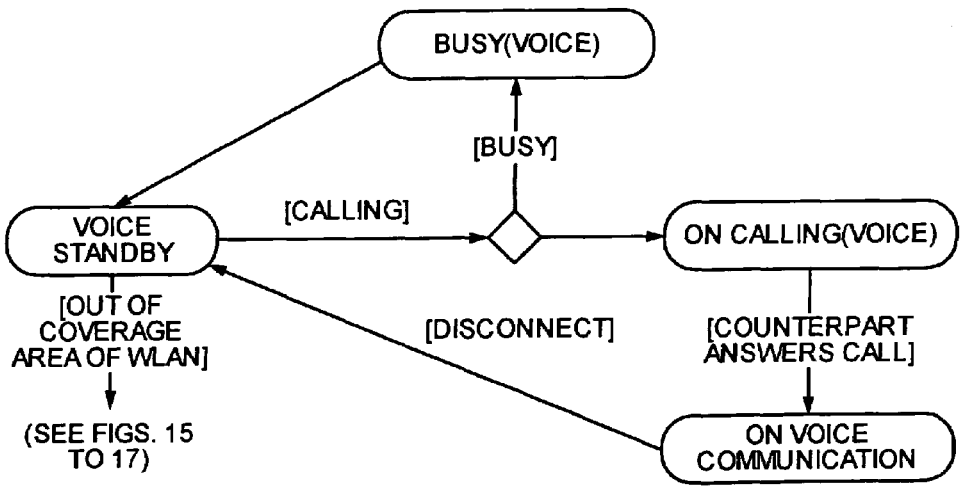
FIG. 12 is a state transition diagram of the voice communication apparatus making a normal call in the coverage area of the WLAN.

FIGS. 10 to 20 are state transition diagrams of the apparatus 100 with the SIP server interposed between the apparatus 100 and the caller. FIG. 10 is a state transition diagram of the apparatus 100 receiving an incoming call during voice standby in the coverage area of the WLAN with only the PHS turned ON. In this case, the VoIP call back is made with only the WLAN turned ON as described above. FIGS. 11 and 12 are state transition diagrams of the apparatus 100 making a call similarly in the coverage area of the WLAN. As the method of making the call, there are a VoIP calling scheme with only the WLAN turned ON as shown in FIG. 11, and a voice calling scheme with only the PHS turned ON (which is the same as the normal scheme of making a call by the PHS) as shown in FIG. 12.

Figure 13:
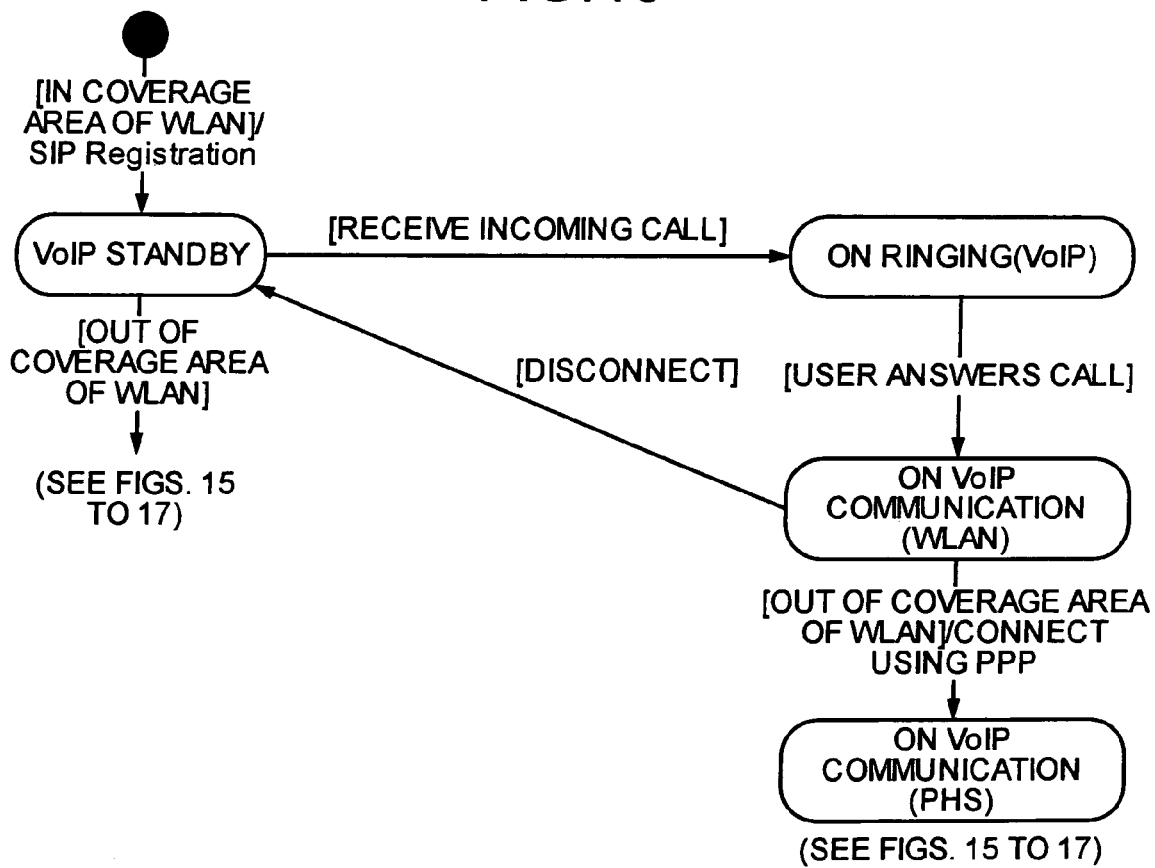
FIG. 13 is a state transition diagram of the voice communication apparatus receiving an incoming call during VoIP standby in the coverage area of the WLAN.
Figure 14:
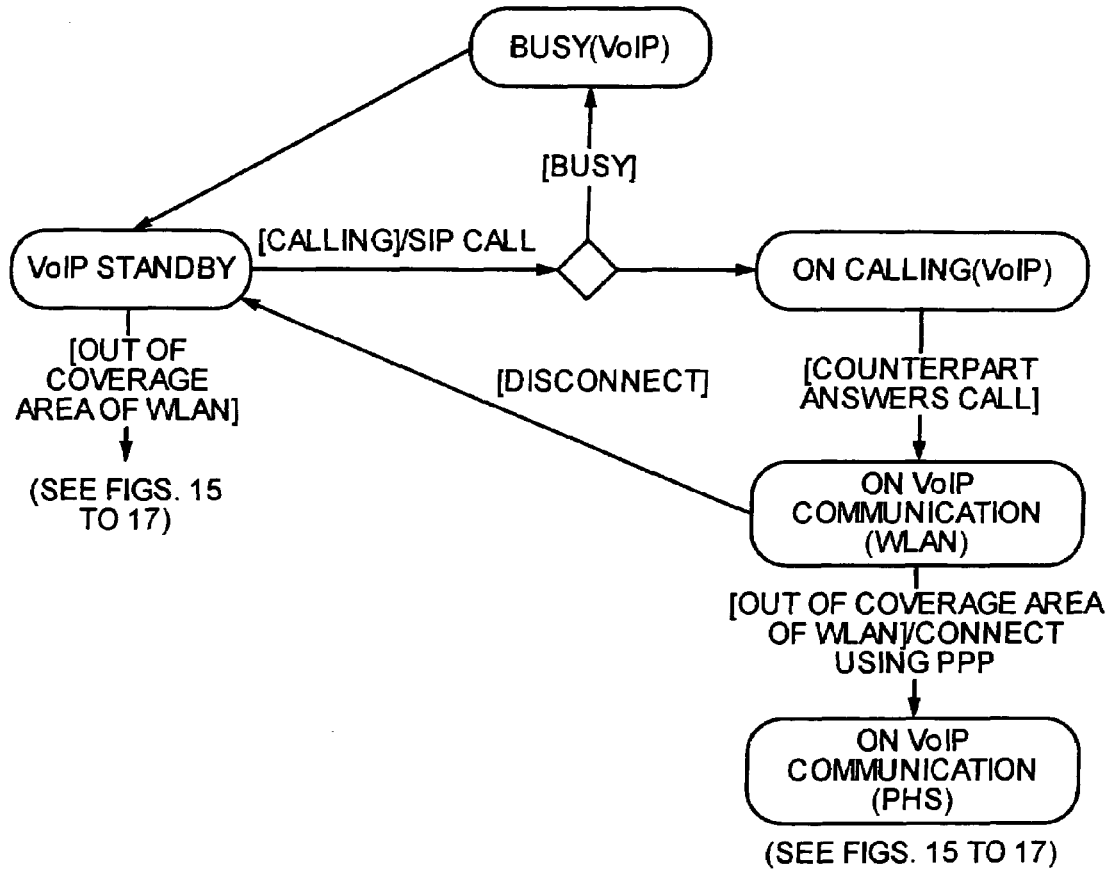
FIG. 14 is a state transition diagram of the voice communication apparatus making a call in the coverage area of the WLAN.

The first and the second embodiments are adapted to exclusively use the PHS for standby as long as the apparatus 100 is in the coverage area of the PHS even if it is in the coverage area of the WLAN, but if battery saving is not taken into consideration, it is possible, of course, to use the WLAN for standby in the coverage area of the WLAN irrespective of whether the PHS is in or out of the coverage area. FIG. 13 is a state transition diagram of the apparatus 100 receiving an incoming call during VoIP standby (with only the WLAN turned ON) in the coverage area of the WLAN. On the other hand, FIG. 14 is a state transition diagram of the apparatus 100 making a call in the coverage area of the WLAN. The transitions shown in FIGS. 13 and 14 are substantially the same as the transitions, for example, when a PC with only the WLAN receives and makes IP calls. But the former has an advantage over the latter in that when the WLAN becomes unusable, the call can be continued by switching to the PHS. In FIGS. 13 and 14, only the WLAN is ON throughout the process.

Figure 15:
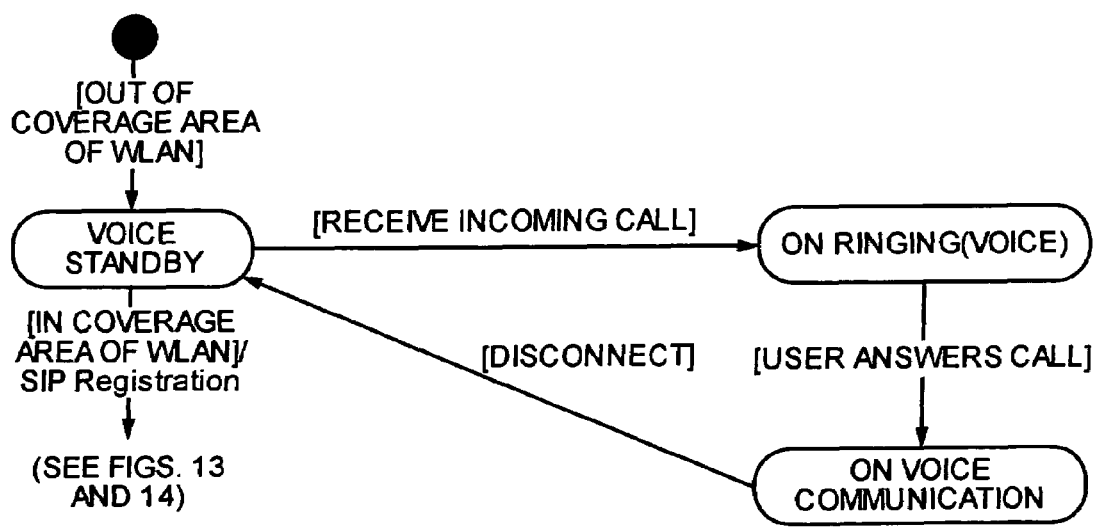
FIG. 15 is a state transition diagram of the voice communication apparatus receiving an incoming call during voice standby out of the coverage area of the WLAN.
Figure 16:
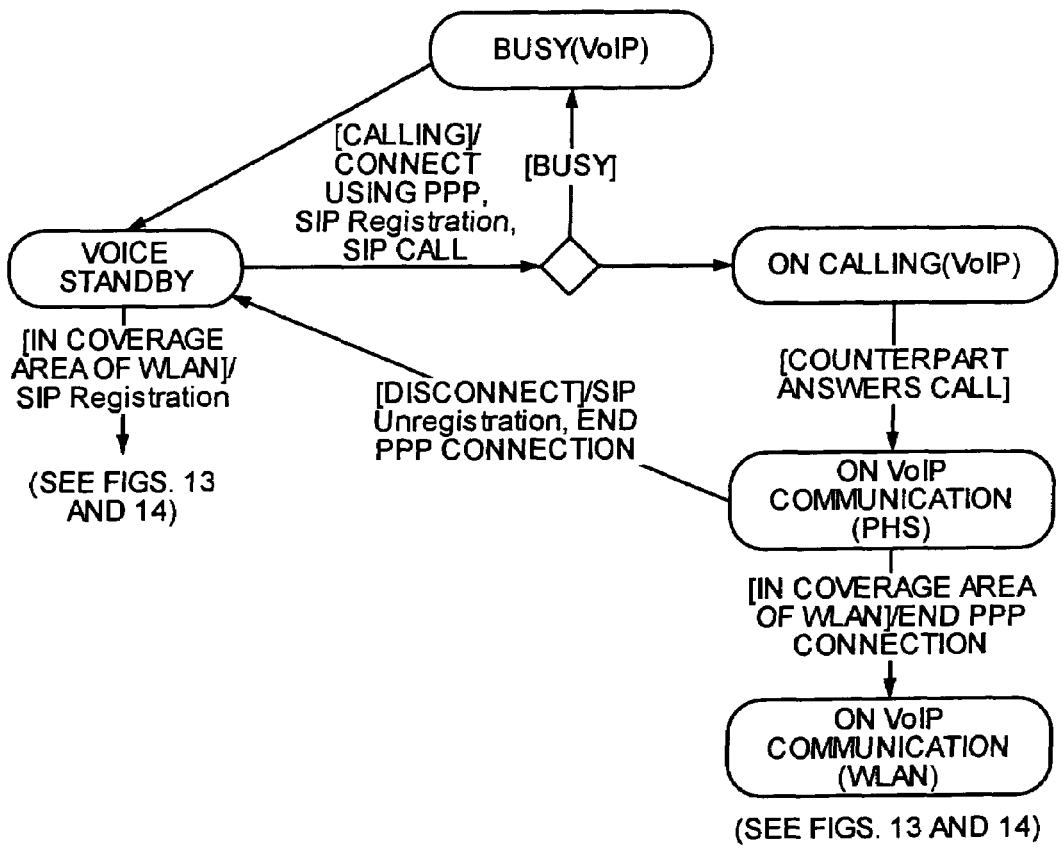
FIG. 16 is a state transition diagram of the voice communication apparatus making a VoIp call out of the coverage area of the WLAN.
Figure 17:
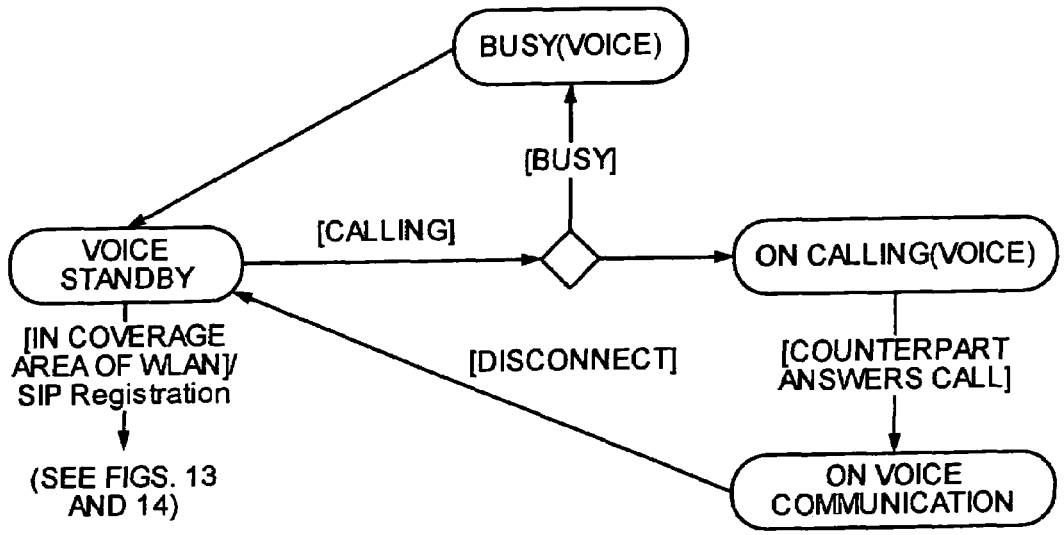
FIG. 17 is a state transition diagram of the voice communication apparatus making a normal call out of the coverage area of the WLAN.

On the other hand, out of the coverage area of the WLAN, the apparatus 100 always performs voice standby (with only the PHS turned ON). FIG. 15 is a state transition diagram of the apparatus 100 receiving an incoming call during voice standby out of the coverage area of the WLAN. The transition is the same as receiving an incoming call in the conventional PHS. However, as for making a call during voice standby out of the coverage area of the WLAN, there are cases of making a VoIP call as shown in FIG. 16 and of making a normal call as shown in FIG. 17. In FIGS. 15, 16, and 17, the PHS is ON and the WLAN is OFF at all times.

Figure 18:
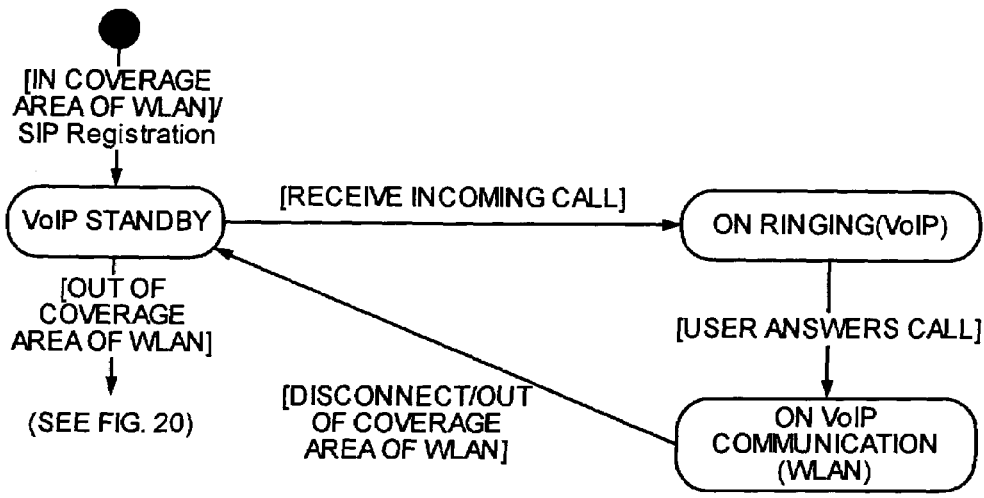
FIG. 18 is a state transition diagram of the apparatus 100, with only the WLAN, receiving an incoming call during VoIP standby in the coverage area of the WLAN.
Figure 19:
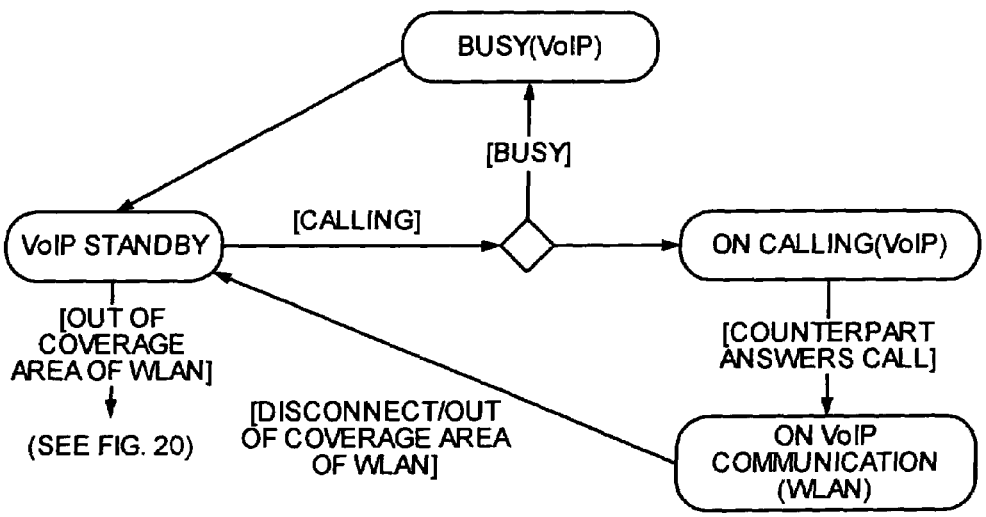
FIG. 19 is a state transition diagram of the apparatus 100, with only the WLAN, making a call in the coverage area of the WLAN.

In the above explanation there is a precondition that the apparatus 100 is provided with both of the PHS and the WLAN, but since the PHS interface 207 is removable from the card slot 101 as explained above, there can be a configuration with only the WLAN in practice. FIG. 18 is a state transition diagram of the apparatus 100, with only the WLAN, receiving an incoming call during VoIP standby in the coverage area of the WLAN. On the other hand, FIG. 19 is a state transition diagram of the apparatus 100, with only the WLAN, making a call in the coverage area of the WLAN. The transition in FIGS. 18 and 19 are the same as transitions of when a PC with only the WLAN receives and makes IP calls. FIG. 20 is a state transition diagram of the apparatus 100, with only the WLAN, is in the VoIP standby state out of the coverage area of the WLAN. In this case, the apparatus 100 can neither receive nor make any call, but the WLAN is periodically turned ON to determine whether the apparatus 100 is in/out of the coverage area of the WLAN.

The voice communication apparatus 100 according to the present invention can be used, for example, in a simple conference system as well as to make and receive calls as with the conventional portable phone. More specifically, the terminals are connected by the WLAN on an ad hoc basis, and any one of the terminals is used as a server (the other terminals being clients) and connected by the PHS to an external network. This server may be adapted to perform processing such as echo cancellation. The apparatus 100 is also used as a ubiquitous remote control that controls a PC, a printer, or a similar information apparatus.

The voice communication method described above with reference to the first and the second embodiments is implemented by executing a prepared program by a processor. This program is recorded on a computer-readable recording medium such as a memory 202, a hard disk, a flexible disk, a CD-ROM, an MO, or a DVD, and is readout of the recording medium and executed by the processor. This program may be a transmission medium that can be distributed over the Internet or similar network.

According to the voice communication method, the voice communication apparatus, and the computer product according to the present invention, there are effects that power consumption can be reduced during standby and at the time of receiving an incoming call. Therefore, the standby time can be lengthened by efficient power supply ON/OFF control for a plurality of radio communication devices mounted in the voice communication apparatus.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A voice communication method comprising:
   detecting an incoming call to a first radio communication device;
   supplying power to a second radio communication device when the incoming call is detected;
   determining whether the second radio communication device is capable of performing communication;
   selecting a radio communication device from either one of the first radio communication device and the second radio communication device based on a result of determination;
   calling back to a caller of the incoming call using the radio communication device; and
   stopping the power supply to a radio communication device not selected at the selecting.

2. The voice communication method according to claim 1, further comprising specifying a call back destination of the caller, wherein
   the supplying includes supplying power to the second radio communication device when the incoming call is detected and the call back destination is specified, and
   the calling back includes calling back to the call back destination using the radio communication device.

3. The voice communication method according to claim 1, wherein the selecting includes selecting the second radio communication device when it is determined at the determining that the second radio communication device is capable of performing communication.

4. The voice communication method according to claim 1, further comprising acquiring information that indicates whether the second radio communication device is in a coverage area or out of the coverage area, wherein
   the acquiring is performed before the determining, and
   the determining includes determining whether the second radio communication device is capable of performing communication based on the information.

5. The voice communication method according to claim 4, further comprising determining whether the first radio communication device is capable of performing communication, and
   wherein the acquiring includes acquiring the information intermittently, and
   the voice communication method further comprising stepwise extending a time interval for acquiring the information when it is determined that both the first radio communication device and the second radio communication device are not capable of performing communication.

6. A computer program that causes a computer to execute:
   detecting an incoming call to a first radio communication device;
   supplying power to a second radio communication device when the incoming call is detected;
   determining whether the second radio communication device is capable of performing communication;
   selecting a radio communication device from either one of the first radio communication device and the second radio communication device based on a result of determination;
   calling back to a caller of the incoming call using the radio communication device; and
   stopping the power supply to a radio communication device not selected at the selecting.

7. The computer program according to claim 6, further comprising specifying a call back destination of the caller, wherein
   the supplying includes supplying power to the second radio communication device when the incoming call is detected and the call back destination is specified, and
   the calling back includes calling back to the call back destination using the radio communication device.

8. The computer program according to claim 6, wherein the selecting includes selecting the second radio communication device when it is determined at the determining that the second radio communication device is capable of performing communication.

9. The computer program according to claim 6, further comprising acquiring information that indicates whether the second radio communication device is in a coverage area or out of the coverage area, wherein
   the acquiring is performed before the determining, and
   the determining includes determining whether the second radio communication device is capable of performing communication based on the information.

10. The computer program according to claim 9, further comprising determining whether the first radio communication device is capable of performing communication; and
    wherein the acquiring includes acquiring the information intermittently, and
    the computer program further comprising stepwise extending a time interval for acquiring the information when it is determined that both the first radio communication device and the second radio communication device are not capable of performing communication.

11. A voice communication apparatus comprising:
    a detecting unit that detects an incoming call to a first radio communication device;
    a power supplying unit that supplies power to a second radio communication device when the incoming call is detected;
    a determining unit that determines whether the second radio communication device is capable of performing communication;
    a selecting unit that selects a radio communication device from either one of the first radio communication device and the second radio communication device based on a result of determination;
    a calling back unit that calls back to a caller of the incoming call using the radio communication device; and
    a power stopping unit that stops the power supply to a radio communication device not selected by the selecting unit.

12. The voice communication apparatus according to claim 11, further comprising a specifying unit that specifies a call back destination of the caller, wherein
    the power supplying unit supplies power to the second radio communication device when the incoming call is detected and the call back destination is specified, and
    the calling back unit calls back to the call back destination using the radio communication device.

13. The voice communication apparatus according to claim 11, wherein the selecting unit selects the second radio communication device when it is determined by the determining unit that the second radio communication device is capable of performing communication.

14. The voice communication apparatus according to claim 11, further comprising an information acquiring unit that acquires information that indicates whether the second radio communication device is in a coverage area or out of the coverage area, the information acquiring unit acquires the information before the determination, wherein the determining unit determines whether the second radio communication device is capable of performing communication based on the information.

15. The voice communication apparatus according to claim 14, wherein the determining unit determines whether the first radio communication device is capable of performing communication, the information acquiring unit acquires the information intermittently, and the voice communication apparatus further comprising an extending unit that extends a time interval for acquiring the information stepwise when it is determined that both the first radio communication device and the second radio communication device are not capable of performing communication.

* * * * *